United States Patent
Gill et al.

(10) Patent No.: US 9,981,539 B1
(45) Date of Patent: May 29, 2018

(54) OPEN ROOF CONSTRUCTION FOR A VEHICLE

(71) Applicant: Inalfa Roof Systems Group B.V., Oostrum (NL)

(72) Inventors: Jordan M. Gill, Holly, MI (US); Ian S. Schornak, Oxford, MI (US)

(73) Assignee: Inalfa Roof Systems Group, B.V., Oostrum (NL)

( * ) Notice: Subject to any disclaimer, the term of this patent is extended or adjusted under 35 U.S.C. 154(b) by 0 days. days.

(21) Appl. No.: 15/420,505

(22) Filed: Jan. 31, 2017

(51) Int. Cl.
*B60J 10/10* (2006.01)
*B60J 10/90* (2016.01)
*B60J 10/18* (2016.01)
*B60J 10/17* (2016.01)
*B60J 7/043* (2006.01)
*B60J 7/047* (2006.01)
*B60J 10/82* (2016.01)

(52) U.S. Cl.
CPC .............. *B60J 10/90* (2016.02); *B60J 7/043* (2013.01); *B60J 7/047* (2013.01); *B60J 10/17* (2016.02); *B60J 10/18* (2016.02); *B60J 10/82* (2016.02)

(58) Field of Classification Search
CPC ................................ B60J 10/82; B60J 10/90
USPC ....................... 296/216.06–216.09
See application file for complete search history.

(56) References Cited

U.S. PATENT DOCUMENTS

| | | | | |
|---|---|---|---|---|
| 4,368,915 A | * | 1/1983 | Torii | B60J 7/022 285/189 |
| 4,416,487 A | * | 11/1983 | Hirotani | B60J 7/022 296/216.07 |
| 5,100,197 A | * | 3/1992 | Ichinose | B60J 7/05 296/213 |
| 5,988,736 A | * | 11/1999 | Kralik | B60J 10/82 296/216.06 |
| 6,364,407 B1 | * | 4/2002 | Raisch | B60J 10/90 296/216.06 |
| 6,485,092 B2 | * | 11/2002 | Iimori | B60J 10/244 296/216.09 |
| 8,966,824 B2 | * | 3/2015 | Gladfelter | B29C 66/1142 49/498.1 |
| 9,308,804 B2 | * | 4/2016 | Roeder | B29C 39/10 |

(Continued)

FOREIGN PATENT DOCUMENTS

| | | | |
|---|---|---|---|
| DE | 202012012291 | * | 8/2013 |
| EP | 1571027 | * | 9/2005 |

*Primary Examiner* — Dennis H Pedder
(74) *Attorney, Agent, or Firm* — Steven M. Koehler; Westman, Champlin & Koehler, P.A.

(57) ABSTRACT

An open roof construction for a vehicle having a roof opening in a fixed roof having a roof edge, defining the roof opening and protruding in a downward direction and further comprising a stationary part, at least one panel to open and close the roof opening. The panel is movably supported by an operating mechanism, guided in a guide rail of the stationary part, extending along at least a longitudinal side of the roof opening. The panel is movable in vertical and longitudinal directions with respect to the roof opening. The stationary part is provided with a sealing assembly comprising a first seal part capable of sealing the panel towards the fixed roof, and a second seal part capable of sealing the stationary part against an inner part of the fixed roof. The first seal part is slidably adjustable with respect to the second seal part in vertical direction.

22 Claims, 7 Drawing Sheets

(56) References Cited

U.S. PATENT DOCUMENTS

2002/0070586 A1* 6/2002 Kohout ................. B60J 7/0435
296/216.09

* cited by examiner

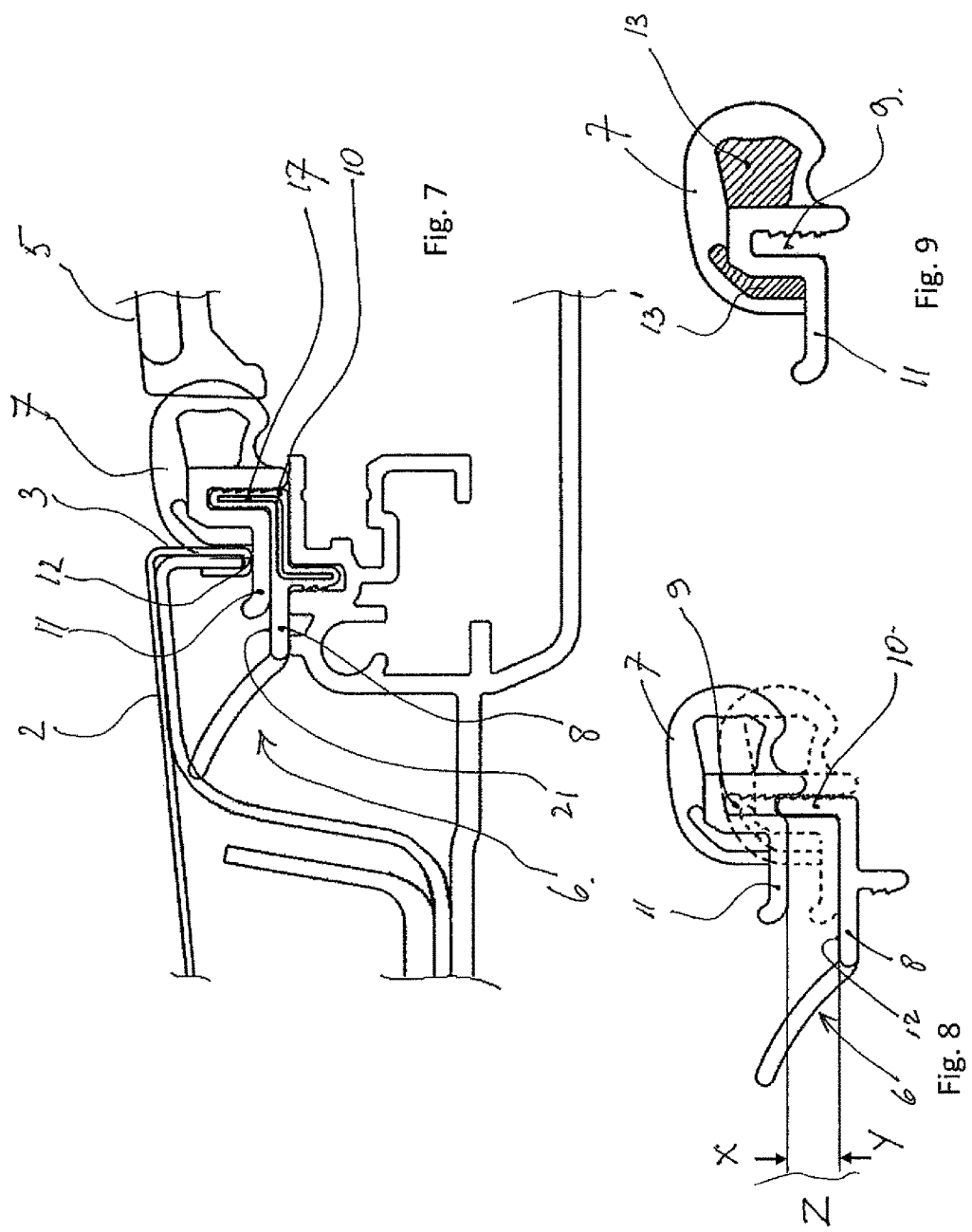

OPEN ROOF CONSTRUCTION FOR A VEHICLE

BACKGROUND

The discussion below is merely provided for general background information and is not intended to be used as an aid in determining the scope of the claimed subject matter.

Aspects of the invention relate to an open roof construction for a vehicle having a roof opening in a fixed roof, the fixed roof having a roof edge defining the roof opening and protruding in a downward direction and further comprising a stationary part, at least one panel for at least partly opening and closing the roof opening, the panel being movably supported by an operating mechanism, guided in a guide rail of the stationary part, extending along at least a longitudinal side of the roof opening, the panel being movable in vertical and longitudinal directions with respect to the roof opening, the stationary part being provided with a sealing assembly comprising a first seal part capable of sealing the panel towards the fixed roof, and a second seal part capable of sealing the stationary part against an inner part of the fixed roof.

Such open roof construction is known in the art whereby the sealing assembly is mounted to the stationary part. A drawback of this sealing assembly is that the tolerances between the stationary part carrying the sealing assembly and the fixed roof outer surface are such that the fit and the appearance of the first seal part is depending on how big the tolerance stack is between these parts. As such the visual impression of the sealing assembly, seen from the outside of the vehicle and also the sealing function as such may be compromised in the vehicle. In such case, in one vehicle the sealing assembly may look wavy from the outside or is protruding outward from the vehicle roof surface. And also the visual impression of the seal may vary from vehicle to vehicle under influence of the different tolerances in each vehicle.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they in-tended to be used as an aid in determining the scope of the claimed subject matter. The claimed subject matter is not limited to implementations that solve any or all disadvantages noted in the Background.

In one aspect the first seal part is slidably adjustable with respect to the second seal part, preferably in vertical direction.

Due to this set up of the seal assembly it is possible to improve the fit of the first seal part between the roof opening and the panel by compensating part of the total of the tolerances that may occur between the stationary part and the outer surface of the fixed roof.

The requirement for flushness between the outer surface of the roof and the seal assembly may be as tight as 0.5 mm. A tighter flushness tolerance can be derived by reducing the total tolerance stack in a vertical direction. In the present case one part of the tolerance stack path involves a first path starting from the upper surface of the mounting surface of the open roof system extending in a vertical direction via the stationary part, via the sealing assembly mounted on the stationary part towards the height of the first seal part. A second path starts at the lower surface of the mounting surface in the vehicle body (the surface which mates with the upper surface of the mounting surface on the open roof construction) and extends in a vertical direction via the body reinforcements to the outside surface of the fixed roof. The flushness between the first seal part and the outer surface of the fixed roof is determined by the difference of these two tolerance paths.

According to another aspect the first seal part further comprises an adjustment hook capable of engaging a lower end of the roof edge. The adjustment hook engages the lower end of the roof edge at least when the open roof construction is mounted and fixed in the vehicle. To reduce the above-mentioned tolerance path in a vertical direction the first seal part is directly hooked up by means of an adjustment hook to the roof edge of the fixed roof. It reduces the total of the first and second tolerance path to a path that only involves the tolerances from the roof edge (the roof edge being basically a through 90 degrees bended part of the fixed roof) and the first seal part itself in a vertical direction.

According to yet another aspect, the first seal part comprises a recess and the second seal part comprises a protruding part and the protruding part is capable of being in slidable engagement with the recess.

The tolerances that still exist with respect to the position of the second seal part which is fitted to the stationary part do not harm the position of the first seal part because there is a slidable engagement between the first and the second seal part. This slidable engagement is defined by a protruding part attached to the second seal part which is extending in a substantial vertical direction and a recess incorporated in the first seal part, which recess is also extending in a substantial vertical direction. The protruding part can also be formed on the first seal part and the recess in the second seal part.

The slidable engagement between the first and second seal part will take up a large part of the total tolerance path.

According to another aspect, the length of the protruding part is defined with regard to the length of the recess such that the first seal part is capable of making a sliding movement Z relative to the second seal part of at least 5 mm. but may extend in other situations up to 50 mm. The first seal part is pre-assembled to the second seal part in a so called "transport" position. This is the position wherein the distance between the bottom of the adjustment hook and the second seal part is largest. This is also the position in which the seal assembly is assembled to the open roof construction and in which the open roof construction is transported from the manufacturer's plant to the OEM plant. The first seal part must be connected firmly to the second seal part to ensure that the first seal does not fall off during transport or maneuvering with the open roof system at the production lines of both the manufacturer and the OEM. This is done by allowing the protruding part to be inside the recess for about at least a quarter of the total length of the recess. This "transport" position of the first seal part is defined by the distance X between the lower edge of the adjustment hook and a base of the second seal part. Once the open roof construction is mounted and fixed in its proper position in the vehicle body whereby the flushness between the fixed roof and the sealing assembly is within the requirements set by the OEM, the distance between the adjustment hook of the first seal part and the base of the second seal part has been reduced to a position designated as "mounting" position with a distance Y between the lower edge of the adjustment hook and the base of the second seal part. The distance the first seal part must slide with regard to the second seal part is determined by the difference in position between these two seal parts measured in the "transport" position (X) and the "mounting" position (Y), this difference is called the sliding movement Z. The lengths of both the recess and the protruding part have to be set to accommodate this sliding movement Z.

According to another aspect, the first seal part further comprises multiple bulb seal portions, wherein a first of the bulb seal portions seals against the panel and a second bulb seal portion seals against the roof edge. These bulbs are located at either side of the recess in the first seal part and as such these bulb seals primarily seal against ingress of water and dirt but also allow for some tolerances to be absorbed in the transverse or longitudinal direction. (i.e. in lateral or longitudinal direction towards the center of the vehicle body or into an opposite direction away from the center of the vehicle body). The second bulb seal portion seal against the roof edge to avoid water ingress, whereby water could be collected on top of the adjustment hook which is not desirable. The outside shape of the second bulb seal has a chamfered shape such that the first seal part will be gradually engaged with the roof edge when the roof construction is moved into a vertical upright direction into the opening of the fixed roof.

According to another aspect, the first seal part comprises a second recess and second protruding part, the latter of which slides into the recess in the same simultaneous manner as the first recess and first protruding part. Also first seal part comprises a third bulb seal portion adjacent to the inner part of roof edge. This is to better balance the sealing assembly while assembling the open roof system, especially when the forces exerted between the open roof system and the vehicle body, when assembling the open roof system towards its mounting position are high, whereby the seal assembly could slide against the roof edge and so be subjected to a friction force which could dislocated the sealing assembly relative to the roof edge. In this embodiment due to both the first recess and protruding part on a first side of the roof edge and the second recess and protruding part on an opposite side of the roof edge the fore mentioned forces are better balanced.

According to another aspect, the second seal part further comprises a lip seal for sealing against an inner part of the fixed roof and a connecting member for connecting the second seal to the stationary part. The second seal part needs to be firmly connected with and pressed against the stationary part by means of the connecting member, to avoid that a loose or not properly installed second seal part may negatively influence the required sliding movement Z as explained above. The function of the lip seal is primarily for noise isolation and avoiding water ingress.

According to another aspect, the first seal part further comprises a reinforcing part for supporting the recess. Such reinforcing part supports the opposite walls of the recess and thereby provides for a clamping force which may clamp the protruding part when the protruding part is inserted into the recess. Also the reinforcing part may support the adjustment hook and extends well underneath the lower end of the roof edge, when the open roof construction and therewith the first seal part is in an assembled position in the vehicle body. Likewise the second seal part further comprises a reinforcing part for supporting the protruding part. Also here it is important to have a support in the protruding part since it is necessary that the protruding part remains in a substantial vertical position when the roof construction is assembled and fixed to the vehicle body.

According to another aspect, the sealing assembly is manufactured in an extrusion process and or a molding process or a combination of an extrusion and a molding process and comprises a material selected from the group of materials known as TPE (thermoplastic elastomer) and/or the group of materials known as EPDM (ethylene propylene terpolymer rubber), wherein each of the used materials may have a different hardness. The first seal part and the second seal part may be manufactured in an extrusion process or a molding process. It is also conceivable that the first seal part is made in an extrusion process and the second seal part in a molding process or vice versa. In corner areas of the roof opening the first and or second seal parts being manufactured in an extrusion process may have separate molded parts that are connected to the first and second seal part whereby the separate molded parts may have substantially the same cross section as the first and second seal parts.

According to another aspect, the material of the protruding part of the second seal part comprises an increased hardness in comparison to the remainder of the sealing part to enhance the stiffness of the protruding part. As explained above when the open roof construction is assembled and fixed to the vehicle body the seal assembly needs to be in a proper position whereby the engagement hook will be brought into contact with the lower end of the roof edge. To enable this, the carrying part in the seal assembly, namely the protruding part must be stiff enough to maintain a substantial vertical position while the open roof construction is assembled and fixed into the vehicle body. The enhanced stiffness of the protruding part may also extend via the base of the second seal part and include also the connecting member.

According to another aspect, the protruding part of the second seal part comprises hooking members and the dimensions of the inside of the recess in the first seal part and of the outside of the protruding part of the second seal part relative to each other are formed such that a force applied to the first seal part in a vertical upward direction in order to remove the first seal part from the second seal part shall be higher than the force required to slide the second seal part with the protruding part into the recess of the first seal part. As described above it is important that the forces that may be subjected to the sealing assembly do not jeopardize its function. As such during the time in between the moment the first seal part is assembled on the second seal part, and the moment the open roof construction is actually fixed in the vehicle body the first seal part may not come off. And also the forces that are applied to the sealing assembly, when the open roof construction is assembled and fixed into the body, should be set at a level that a swift assembly using acceptable forces by the maneuvering fixtures and torque rates on the fixing tools is guaranteed.

According to another aspect one or both of the first and the second bulb seal portions comprises a hollow space which is filled with a cellular rubber from the group of materials known as EPDM, having a low density. Using such cellular rubber in the otherwise hollow bulb seal portions, it is possible to set the sealing pressure (i.e. the pressure that the seal implies on another part) to a higher value. This may be beneficial especially (but not limited to) the second bulb seal portion.

According to yet another aspect, the open roof construction according to the invention is able to be assembled and fixed to the vehicle body by a method comprising the steps of:

bringing the open roof construction by means of a maneuvering fixture into the interior of a vehicle body wherein the first seal part mounted with its recess onto the protruding part of the second seal part such that the adjustment hook extends at a "transport" position with a distance X between the adjustment hook and a base of the second seal part. Such maneuvering fixture is capable of picking up the complete open roof construction from the crate it has been transported with and maneuvering it into the vehicle body through one of the door apertures or the front wind screen apertures. Such maneuvering system is known per se and not further described.

In a next step moving the open roof construction with its mounting surface on the stationary part by means of the maneuvering fixture vertically upward towards the mounting surface in the vehicle body, the maneuvering fixtures each comprising locating members which are in engagement with a location hole in the stationary part, and pushing the adjustment hook which is positioned in a "transport" position with a distance X between the adjustment hook and the base of the second seal part against the lower end of the roof edge. In this process step the open roof construction will be aligned in front rear and left right direction with regard to the vehicles orthogonal axis by means of the engaging locating members, and there with the panel or panels of the open roof construction are aligned in these directions with the roof opening in the fixed roof and also the locating and fixing members on the mounting surfaces of the stationary part are aligned with the locating and fixing members on the mounting surfaces in the vehicle body. The maneuvering fixtures may have any type of locating members such as a pin in hole solution whereby the pin can be allocated on a frame part of the maneuvering fixtures or on the open roof construction mounting surface as the case may be. The fixing members may comprise bolts and nuts or the like.

In a following step, continuing to move the open roof construction in a vertical upward direction by means of the maneuvering fixture, whereby the locating members engage with the locating hole of the vehicle body and further moving the second seal part with its protruding part further into the recess of the first seal part until the mounting surface of the open roof construction meets the mounting surface in the vehicle body and further positioning the adjustment hook in a "mounting" distance Y between the adjustment hook and the base of the second seal part. This process step is the last movement step of the open roof construction. The open roof construction has now been positioned in its final mounting position whereby the locating members are engaged. The first seal part has moved over the protruding part by a moving distance Z. The first seal part may lie now within the tolerance band with regard to the outside surface of the fixed roof.

In a final step, fixing or tightening the fixing members on the mounting surfaces to fixedly mount the open roof system in the vehicle body. This last step completes the process of assembly of the open roof construction to the vehicle body.

According to another aspect, the force required for moving the second seal part with its protruding part further into the recess of the first seal part until the mounting surface of the open roof construction meets the mounting surface in the vehicle body is raised by fixing or tightening the fixing members on the mounting surfaces. The force required to slide the protruding part of the second seal part into the recess of the first seal part is not only determined by the hooking members on the protruding part and the dimensions of the inside of the recess part in said first seal part and of the outside of the protruding part of the second seal part relative to each other, but also this force is determined by the length of the seal assembly along the circumference of the panel or panels of the open roof construction. The longer this length, the higher the total force becomes to slide the protruding part into the recess. In such cases where the force to be exerted by the maneuvering fixture becomes too high and it is not possible to arrange for the fixture equipment to supply enough force, it is conceivable to use the force that is raised by fixing or tightening the fixing members to move the open roof construction over the moving distance Z, and thereby sliding the protruding part further into the recess.

The open roof construction as explained above may comprise a single panel, but it is conceivable that the construction comprises multiple panels. Also the type of open roof construction may be one of the type of a so called top slider, whereby the front panel during opening lifts in an upward direction and slides rearward above the rear panel or the rear part of the fixed roof as the case may be. It is also conceivable that the type of open roof construction is a so called down slider, whereby the panel during opening drops in a downward direction and slides rearward underneath the rear panel or the fixed roof as the case may be.

BRIEF DESCRIPTION OF THE DRAWINGS

FIG. 6-7 are a sectional views taken along line III-III in FIG. 2 of the open roof construction, but showing two different embodiments of the sealing assembly.

FIG. 8 is a sectional view showing two adjustment positions of the sealing assembly of FIG. 7.

FIG. 9 is a sectional view across the first seal part showing a further embodiment of the first seal part.

DETAILED DESCRIPTION OF THE ILLUSTRATIVE EMBODIMENTS

Figure 1:
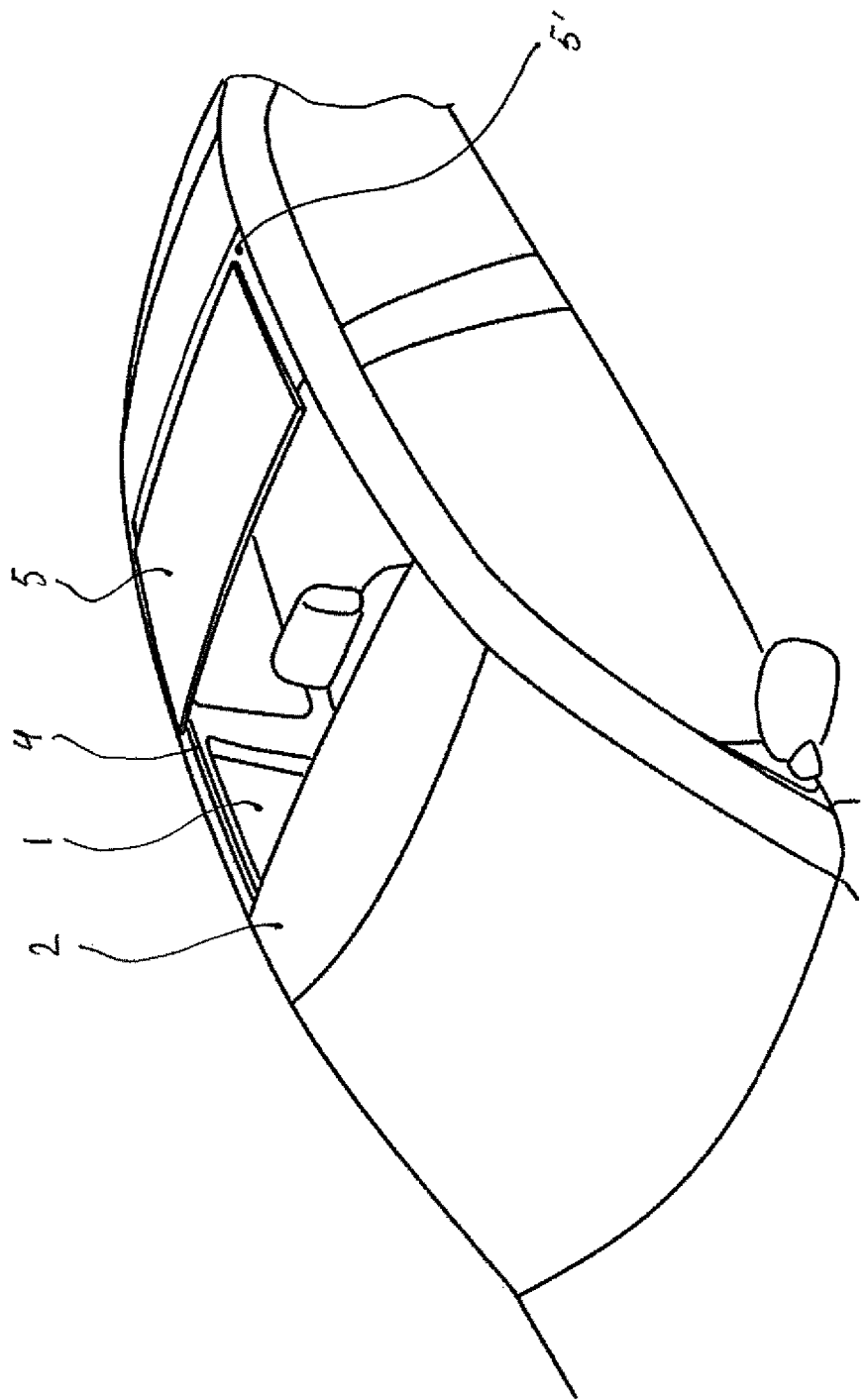
FIG. 1 is an isometric perspective view of the upper part of the vehicle in which an open roof construction is provided.

FIG. 1 shows a vehicle such as a passenger car or a utility vehicle provided with an open roof construction having a roof opening 1 in a fixed roof 2 and at least one panel 5 for at least partly opening and/or closing the roof opening 1, the panel 5 being movably supported by an operating mechanism 4'(schematically illustrated, but known in the art), the operating mechanism guided in a guide rail 4" of the stationary part 4, extending along at least a longitudinal side of the roof opening 1, the panel 5 being movable in vertical and longitudinal directions with respect to the roof opening 1. The open roof construction can be of the type whereby the panel 5 slides to an open position at the exterior side of the vehicle body, but it can also be of the type whereby the panel 5 slides to an open position at the interior side of the body.

Figure 2:
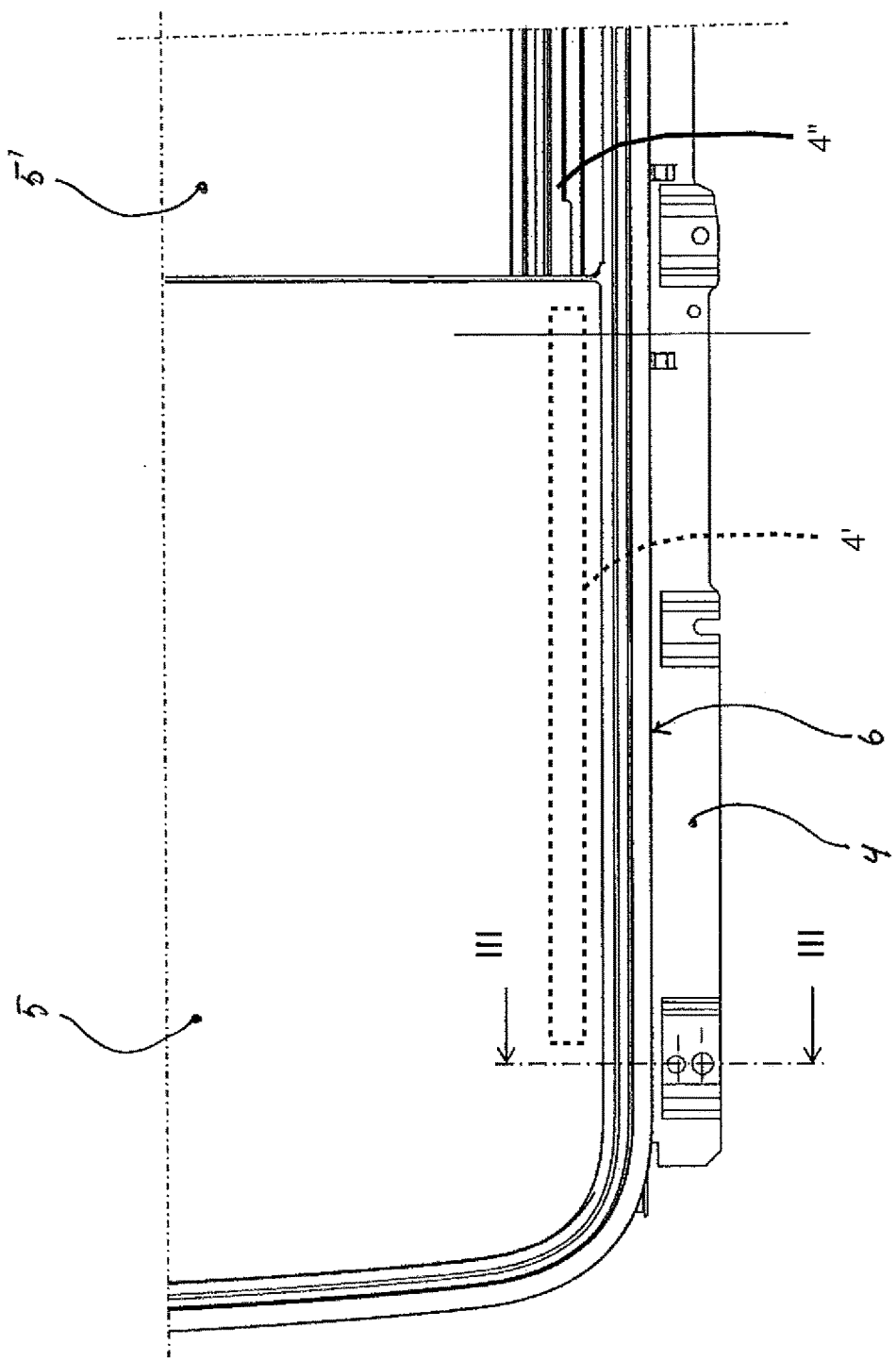
FIG. 2 is a plan view showing a part of an open roof construction in isolation from the vehicle body.

FIG. 2 shows the open roof construction in a plan view, showing the panel 5 and part of the stationary part 4, here the sealing assembly 6 is shown which runs along a longitudinal side of the roof opening 1 (along the longitudinal side edge of the panel 5 towards the front of the roof opening 1 and panel 5). The open roof construction may comprise just one panel 5, but may have one or more rear panels 5', whereby the rear panels 5' may be fixed to the stationary part 4 or directly to the vehicle body or may be movable too.

Figure 3:
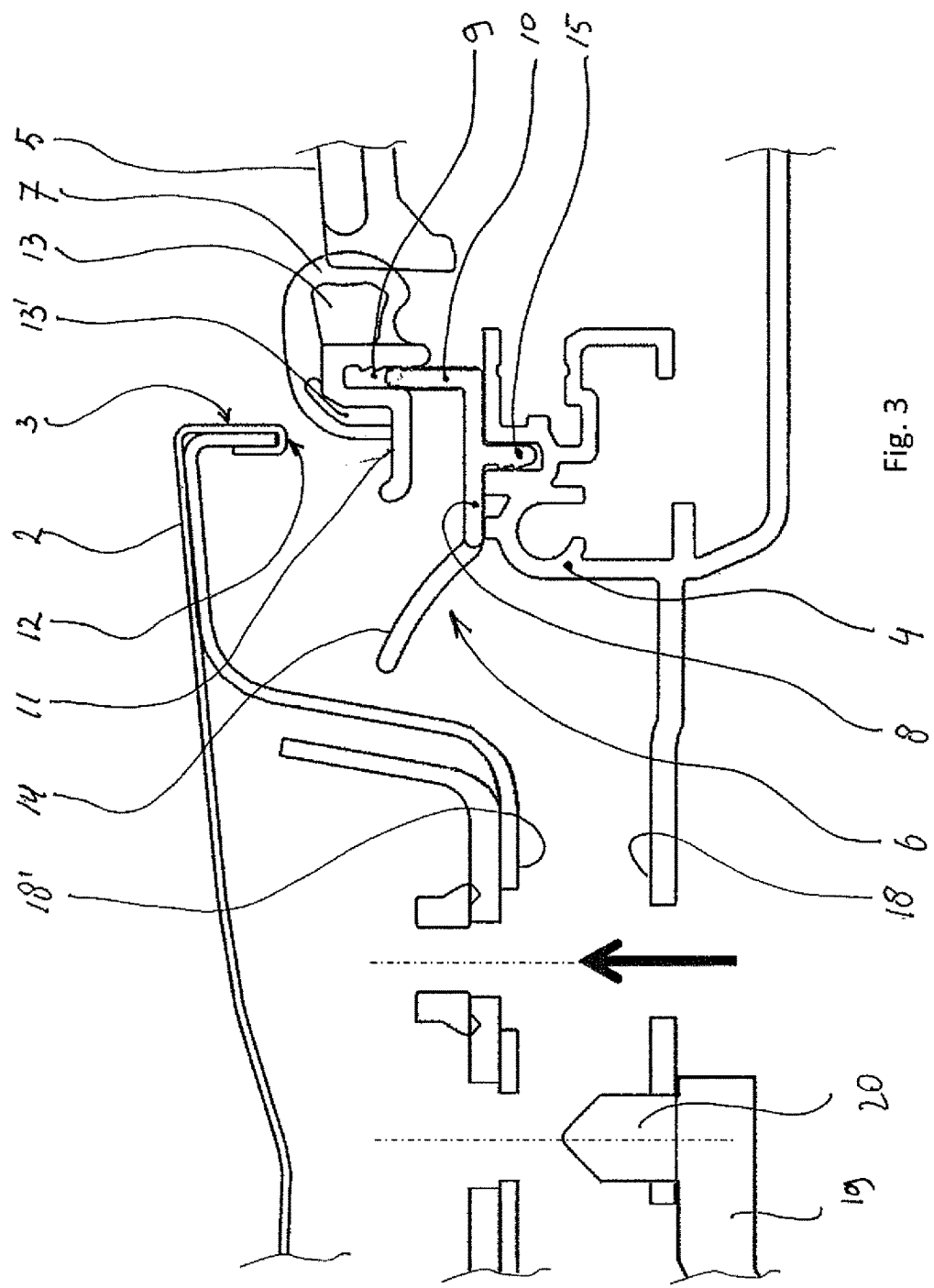
FIG. 3-5 are sectional views taken along line III-III in FIG. 2 of the open roof construction showing the sealing assembly relative to the fixed roof in three different stages of the method of assembly.
Figure 4:
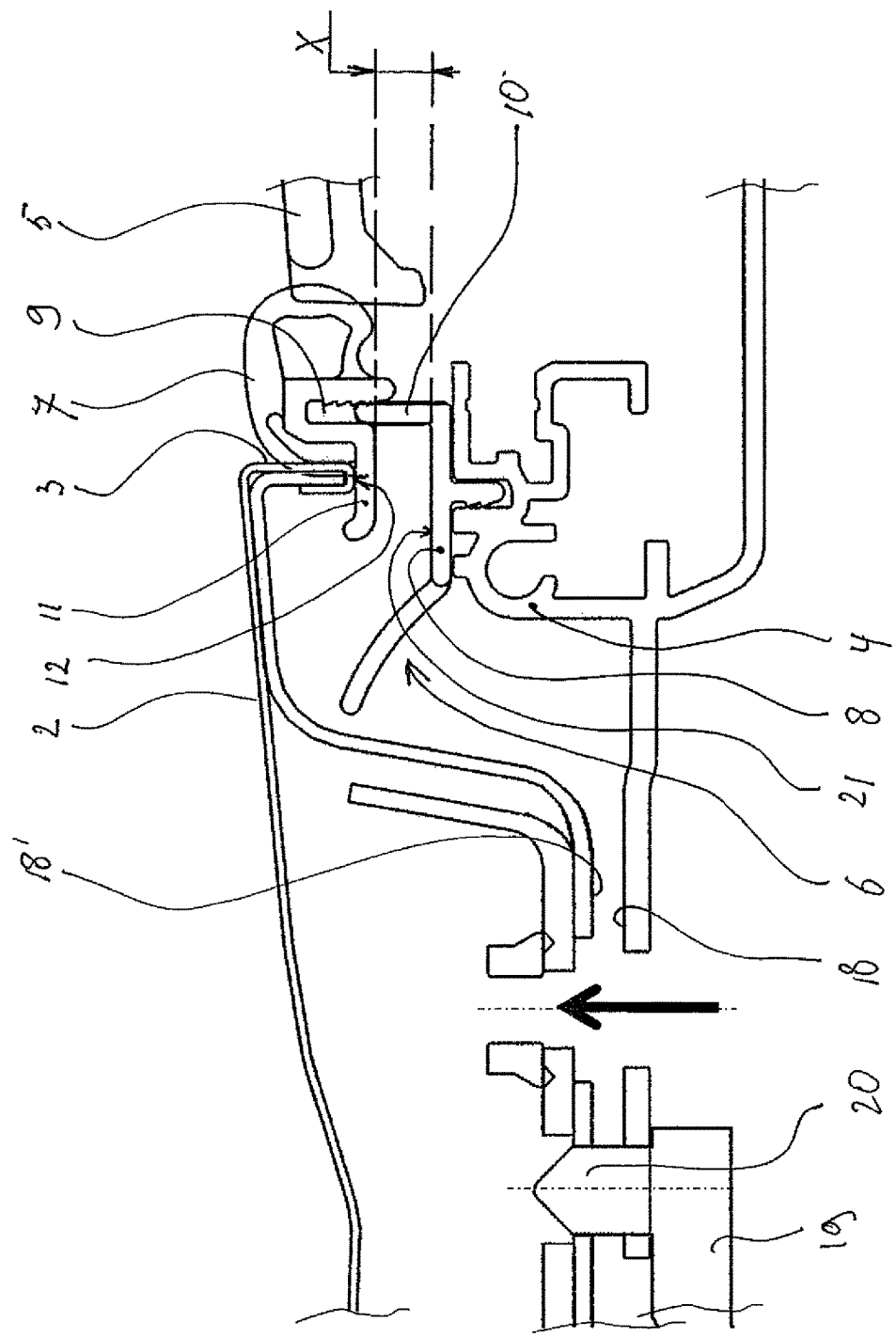
Figure 5:
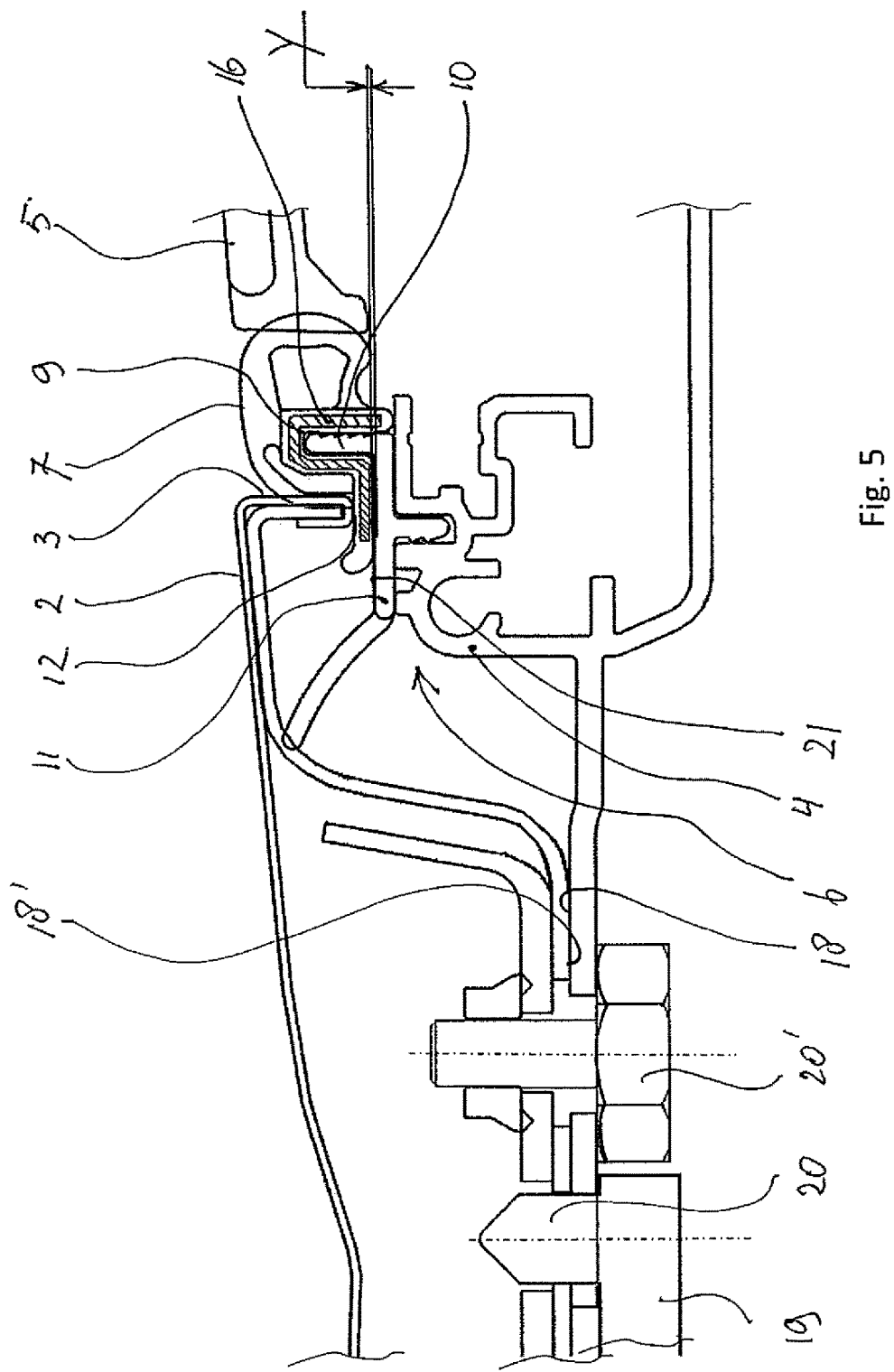

FIGS. 3 to 5 show the open roof construction in different positions towards the fixed roof 2. In FIG. 3 the open roof construction is aligned with the roof opening 1 in the fixed roof 2 of the vehicle body in a front to rear and in a transverse left to right direction with regard to the orthogonal axis of the vehicle body. However in vertical direction the open roof construction is still a distance away from the fixed roof 2. First seal part 7 is positioned on second seal part 8. Second seal part 8 is fitted into a substantially vertically directed groove in the stationary part 4. First seal part 7 is engaged with second seal part 8 via recess 9 and protruding part 10, which both run around the circumference of stationary part 4 and panels 5, 5' and are directed in substantially vertical direction. First bulb seal portion 13 is in engagement with a side surface of panels 5, 5'. The open roof construction is held in this position by means of a maneuvering fixture 19.

In FIG. 4 the open roof construction has been moved in a vertical direction towards the fixed roof 2, by means of the maneuvering fixture 19. The locating members 20 incorporated in the maneuvering fixture 19 (but which may be alternatively attached to or incorporated in or to the mounting surfaces 18, 18') have been engaged with both of the open roof construction and the vehicle body mounting surfaces, whereby the locating member (20) engages with the locating hole of the vehicle body, so as to properly locate the open roof construction with respect to the vehicle body in a front/rear and in a left/right direction with respect to the orthogonal axis of the vehicle body. In the position shown in FIG. 4 the adjustment hook 11 just engages the lower end 12 of the roof edge 3, and the dimension X shows the distance between the lower side of the adjustment hook 11 and the upper side of the base 21 of the second seal part 8. This distance X being the distance designate as "transport" distance. As of this position the open roof construction by means of a maneuvering fixture 19 is moved further in a vertical direction, whereby the protruding part 10 of the second seal part slides further into the recess 9 of the first seal part 7 of the seal assembly. This sliding movement is caused by the adjustment hook 11 of the first seal part 7 which hooks behind the lower end 12 of the roof edge 3 while the open roof construction and thereby the second seal part fixed on the stationary part 4 is moved in a vertically upward direction by the maneuvering fixture 19. This sliding movement stops when the mounting surface 18 attached to the stationary part 4 of the open roof construction comes in contact with its counter mounting surface 18' in the vehicle body, which situation is shown in FIG. 5.

When the open roof construction is in this mounting position, fixing members 20' are applied to permanently fix the open roof construction to the vehicle body. Furthermore in FIG. 5 is shown the first seal part 7 comprising a recess 9 and a first and a second bulb seal portion 13, 13'. The first bulb seal portion 13 is located between the panel 5 and the recess 9 and its main function is to seal the panel 5 against stationary part 4. The second bulb seal portion 13' is located between the recess 9 and the roof edge 3 and its main function is to seal between the stationary part 4 and the roof edge 3. The function of the adjustment hook 11 is to keep the first seal part 7 in place with regard to the roof edge 3 when the second seal part 8 slides in an upward direction. Furthermore the adjustment hook 11 may be a part that is supported by a reinforcement 16, but its outside material may be a material selected from the group of materials known as TPE and/or the group of materials known as EPDM, whereby it is conceivable that the hook 11 has a noise sealing function against the lower end 12 of the roof edge 3. The reinforcement 16 may support the walls that form the recess 9 and the reinforcement 16 may extend at least partly into the adjustment hook 11.

Figure 6:
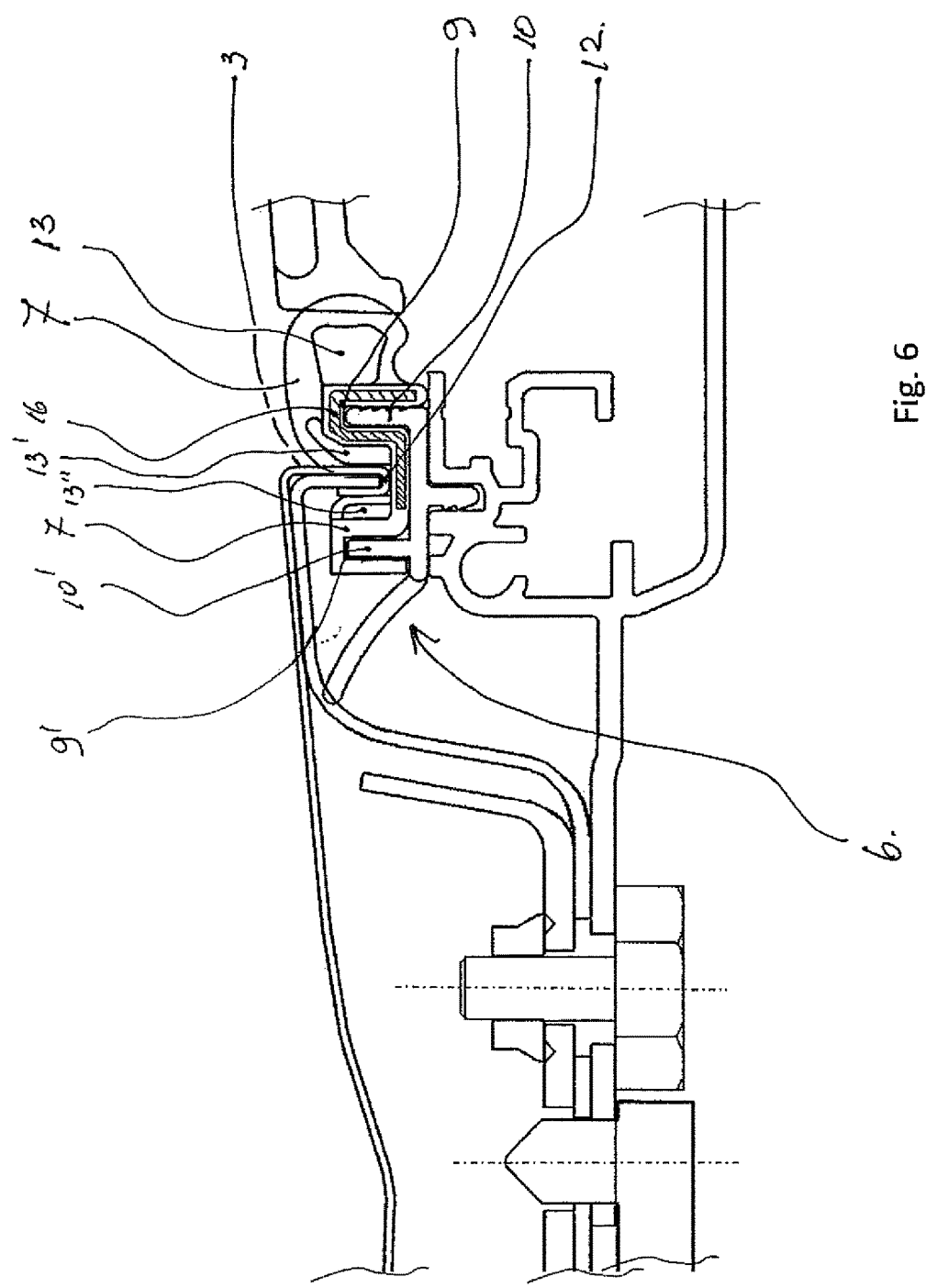

The second seal part may be made of a material from the group of materials known as TPE and/or the group of materials known as EPDM and comprises a protruding part 10 having hooking members which may be formed by such material. Also it is conceivable that the second seal part 8 may comprise a reinforcement 17 inside the section of the protruding part 10 and extending through the base 21 of the second seal part 8 into the connecting member 15 as is shown in FIG. 6. The second seal part 8 further comprises a lip seal 14 to seal between the stationary part 4 and the inside of the fixed roof 2.

Furthermore in the embodiment of FIG. 6, the first and second seal parts 7, 8 comprise a second recess 9' and second protruding part 10' the latter which slides into the recess 9' in the same simultaneous manner and due to the same process features as described for the first recess 9 and first protruding part 10. Also first seal part 7 comprises a third bulb seal portion 13" adjacent to the inner part of roof edge 3. So the first recess and protruding parts 9, 10 and the second recess and protruding part 9', 10' each are adjacent to an opposite edge of the roof edge when the open roof construction is mounted in the vehicle body. In this way the forces that may arise from pushing the first protruding part 10 into first recess 9 and the forces arising from the second protruding part and recess (10', 9') are in balance (left to right) with each other in view of the lower end 12 of the roof edge 3 which acts as a sort of pivot point.

With reference to the embodiment shown in FIG. 7, it is explained what the "transport" position (X) is of the first seal part 7 related to the second seal part 8 and also the "mounting" position (Y) and the sliding distance (Z) between these positions. In practise the "mounting" position Y may not be at the extreme position as drawn here. This depends on the tolerances stacks present in the vehicle body and the sealing assembly. For instance in a vehicle where the tolerance stacks may be such that the first seal 7 may slide only a limited distance over the protruding part 10, 10' of the second seal part 8.

FIG. 8 shows the first and second bulb seal portions 13, 13' which in a preferred embodiment are hollow, however it is also conceivable that these hollow chambers are filled with a cellular rubber from the group of materials known as EPDM, having a low density.

FIG. 9 shows another embodiment of first seal part 7, one or both (here both) of the first and the second bulb seal portions 13, 13' thereof comprises a hollow space which is filled with a cellular rubber from the group of materials known as EPDM, having a low density.

From the foregoing it will be clear that aspects of the invention provide a sealing means in an open roof construction capable of providing a better visual impression and sealing quality when built into a vehicle.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims. Aspects of the various embodiments can be used in other combinations.

The invention claimed is:

1. An open roof construction for a vehicle having a vehicle body with a roof opening in a fixed roof, the fixed roof having an inner roof edge, defining the roof opening and protruding in a downward direction, the open roof construction comprising:
   a stationary part;
   at least one panel for at least partly opening and closing the roof opening, the panel being movably supported by an operating mechanism, guided in a guide rail of the stationary part, extending along at least a longitudinal side of the roof opening, the panel being movable in vertical and longitudinal directions with respect to the roof opening; and
   a sealing assembly comprising a first seal part configured to seal the panel towards the fixed roof, and a second seal part configured to seal the stationary part against an inner part of the fixed roof wherein the first seal part is slidably adjustable on a portion of the second seal part.

2. The open roof construction according to claim 1, wherein one of the first seal part and the second seal part comprises a first recess and the other of the first seal part and the second seal part comprises a first protruding part and wherein the protruding part and the recess are in slidable engagement with each other.

3. The open roof construction according to claim 1, wherein the first seal part further comprises an adjustment hook configured to engage a lower end of the roof edge.

4. The open roof construction according to claim 1, wherein the first seal part further comprises a plurality of bulb seal portions, wherein a first of the bulb seal portions seals against the panel and a second bulb seal portion seals against the roof edge.

5. The open roof construction according to claim 2, wherein the one of the first seal part and the second seal part that comprises a first recess further comprises a second recess, and wherein the other of the first seal part and the second seal part that comprises a first protruding part further comprises a second protruding part and wherein the first recess and the first protruding part and the second recess and the second protruding part each are adjacent to an opposite side of the inner roof edge when the open roof construction is mounted in the vehicle body.

6. The open roof construction according to claim 5 wherein the second seal part further comprises a reinforcing part configured to support the protruding part.

7. The open roof construction according to claim 2 wherein the first seal part further comprises a reinforcing part configured to support the first recess.

8. The open roof construction according to claim 3, wherein the adjustment hook engages the lower end of the roof edge at least when the open roof construction is mounted and fixed in the vehicle.

9. The open roof construction according to claim 2, wherein a length of the protruding part is defined with regard to the length of the first recess such that the first seal part is capable of making a sliding movement relative to the second seal part of at least 5 mm.

10. The open roof construction according to claim 1, wherein the sealing assembly is manufactured in an extrusion process and or a molding process or a combination of an extrusion and a molding process and comprises a material selected from a group of materials known as TPE.

11. The open roof construction according to claim 1 wherein the sealing assembly is manufactured in an extrusion process and or a molding process or a combination of an extrusion and a molding process and comprises a material selected from a group of materials known as EPDM, wherein each of the materials has a different hardness.

12. The open roof construction according to claim 2, wherein a material of the protruding part of the second seal part comprises an increased hardness in comparison to a remainder of the sealing part to enhance stiffness of the first protruding part.

13. The open roof construction according to claim 2, wherein the second protruding part comprises hooking members and dimensions of an inside of the first recess and of an outside of the second protruding part relative to each other are configured such that a force applied to the first seal part in a vertical upward direction in order to remove the first seal part from the second seal part shall be higher than the force required to slide the second seal part with the first protruding part into the first recess.

14. The open roof construction according to claim 4 wherein one or both of the first and the second bulb seal portions of the first seal part comprises a hollow space which is filled with a cellular rubber from a group of materials known as EPDM, having a low density.

15. The open roof construction according to claim 1, wherein the first seal part is slidably adjustable with respect to the second seal part in a substantially vertical direction.

16. The open roof construction according to claim 1, wherein the second seal part is attached to the stationary part.

17. A vehicle having a roof opening in a fixed vehicle roof, the fixed vehicle roof having an inner roof edge, defining the roof opening and protruding in a downward direction, the vehicle being provided with an open roof construction comprising:
   a stationary part mounted to the vehicle roof;
   at least one panel for at least partly opening and closing the roof opening, the panel being movably supported by an operating mechanism, guided in a guide rail of the stationary part, extending along at least a longitudinal side of the roof opening, the panel being movable in vertical and longitudinal directions with respect to the roof opening; and
   a sealing assembly comprising a first seal part configured to seal the panel towards the vehicle roof, and a second seal part configured to seal the stationary part against an inner part of the vehicle roof wherein the first seal part is slidably adjustable on a portion of the second seal part.

18. A method of installing an open roof construction in a vehicle, the vehicle having a roof opening in a fixed roof, said roof having a roof edge, defining the roof opening and protruding in a downward direction and further comprising a stationary part, at least one panel for at least partly opening and closing the roof opening, the panel being movably supported by an operating mechanism, guided in a guide rail of the stationary part, extending along at least a longitudinal side of the roof opening, the panel being movable in vertical and longitudinal directions with respect to the roof opening, the stationary part being provided with sealing assembly comprising a first seal part capable of sealing the panel towards the fixed roof, and a second seal part capable of sealing the stationary part against an inner part of the fixed roof wherein the first seal part is slidably adjustable on a portion of the second seal part, the method comprising:

bringing the open roof construction by means of a maneuvering fixture into an interior of a vehicle body wherein the first seal part mounted with a recess onto a protruding part of the second seal part such that the adjustment hook extends at a transport position with a distance X between the adjustment hook and a base of the second seal part;

moving the open roof construction with a mounting surface on the stationary part by means of the maneuvering fixture vertically upward towards a mounting surface in the vehicle body, said maneuvering fixture comprising a locating member, which is in engagement with a location hole in the stationary part and pushing the adjustment hook which is positioned in a transport position with a distance X between the adjustment hook and the base of the second seal part against the lower end of the roof edge;

continuing to move the open roof construction in a vertical upward direction by means of the maneuvering fixture whereby the locating member engages with the locating hole of the vehicle body and further moving the second seal part with its protruding part further into the recess of the first seal part until the mounting surface of the open roof construction meets the mounting surface in the vehicle body and further positioning the adjustment hook in a mounting position with a distance Y between the adjustment hook and the base of the second seal part; and fixing or tightening fixing members on the mounting surfaces to fixedly mount the open roof construction in the vehicle body.

19. The method of installing an open roof construction in a vehicle according to claim 18, wherein a force required for moving the second seal part with its protruding part further into the recess of the first seal part until the mounting surface of the open roof construction meets the mounting surface in the vehicle body is raised by fixing or tightening the fixing members on the mounting surfaces.

20. The vehicle of claim 17, wherein the first seal part is connected to the second seal part in a vertically adjustable manner.

21. An open roof construction for a vehicle having a vehicle body with a roof opening in a fixed roof, the fixed roof having an inner roof edge, defining the roof opening and protruding in a downward direction, the open roof construction comprising:

a stationary part;

at least one panel for at least partly opening and closing the roof opening, the panel being movably supported by an operating mechanism, guided in a guide rail of the stationary part, extending along at least a longitudinal side of the roof opening, the panel being movable in vertical and longitudinal directions with respect to the roof opening; and a sealing assembly comprising a first seal part configured to seal the panel towards the fixed roof, and a second seal part configured to seal the stationary part against an inner part of the fixed roof wherein the first seal part is slidably adjustable with respect to the second seal part; and wherein the first seal part and the second seal part are coupled together by two spaced apart couplings, each coupling comprising a protruding part and a recess configured to mate with the protruding part.

22. The open roof construction according to claim 21, wherein the couplings are spaced apart from each other such that the inner roof edge protrudes in the downward direction between the spaced apart couplings.

* * * * *